(12) United States Patent
Schambre et al.

(10) Patent No.: US 6,557,933 B1
(45) Date of Patent: May 6, 2003

(54) CABLE ACTUATOR FOR RETRACTABLE HEADREST

(75) Inventors: John E Schambre, Canton, MI (US); Marcus G Washington, Southfield, MI (US); Jack Soullier, Troy, MI (US); Liliana Neag, Walled Lake, MI (US); Louis D DeLellis, South Lyon, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/146,090

(22) Filed: May 15, 2002

(51) Int. Cl.$^7$ ................................................ B60N 2/48
(52) U.S. Cl. ..................................................... 297/61
(58) Field of Search ........................ 297/61, 391, 410, 297/378.12

(56) References Cited

U.S. PATENT DOCUMENTS

| | | |
|---|---|---|
| 4,082,354 A | 4/1978 | Renner et al. |
| 4,193,631 A | 3/1980 | Hobley et al. |
| 4,285,545 A | 8/1981 | Protze |
| 4,650,250 A | 3/1987 | Krügener et al. |
| 4,693,515 A | 9/1987 | Russo et al. |
| 4,762,367 A | 8/1988 | Denton |
| 4,978,169 A | 12/1990 | Shannon et al. |
| 5,020,855 A | 6/1991 | Lindberg et al. |
| 5,056,816 A | 10/1991 | Lütze et al. |
| 5,080,437 A | 1/1992 | Pesta et al. |
| 5,346,277 A | 9/1994 | Holobaugh et al. |
| 5,540,479 A | 7/1996 | Thomas et al. |
| 5,681,079 A | 10/1997 | Robinson |
| 5,738,411 A | 4/1998 | Sutton et al. |
| 5,795,023 A | 8/1998 | Kayumi |
| 5,823,619 A * | 10/1998 | Heilig et al. ........... 297/216.12 |
| 5,826,942 A | 10/1998 | Sutton et al. |
| 5,895,094 A | 4/1999 | Mori et al. |
| 5,918,940 A | 7/1999 | Wakamatsu et al. |
| 6,050,633 A | 4/2000 | Droual |
| 6,192,565 B1 | 2/2001 | Tame |
| 6,279,996 B1 | 8/2001 | Albrecht |
| 6,290,299 B1 | 9/2001 | Frisch et al. |
| 6,390,558 B2 * | 5/2002 | Fischer et al. ............... 297/410 |
| 2002/0079723 A1 * | 6/2002 | Risch et al. ................... 297/61 |

* cited by examiner

Primary Examiner—Peter R. Brown
(74) Attorney, Agent, or Firm—Donald J. Wallace

(57) ABSTRACT

A motor vehicle seat frame assembly has a headrest movable between an extended position and a retracted position. The frame assembly comprises a seatback frame operatively engaged with the headrest, a cable, and a rod having an extension. The seatback frame is pivotable from a use position to a lowered position, while the cable extends between the headrest and a fixed point. A tensioner is attached to the seatback frame, and is adapted to wind the cable on the extension when the seatback frame is pivoted toward the lowered position.

12 Claims, 2 Drawing Sheets

CABLE ACTUATOR FOR RETRACTABLE HEADREST

TECHNICAL FIELD OF THE INVENTION

This invention relates generally to seat for motor vehicles, and relates more specifically to a cable actuator for a retractable headrest of a motor vehicle seat.

BACKGROUND OF THE INVENTION

Many motor vehicles, particularly sport utility vehicles and minivans, are equipped with rear seats that can be moved from a seating configuration, in which passengers can sit in the seat, to a so-called "load floor" configuration where the back support of the seat is folded downwardly to assume a horizontal orientation and thereby facilitate cargo stowage in the van. Typically, locking mechanisms are provided for holding the seat in the seating configuration, and the locking mechanisms can be released to permit moving the seat to the load floor configuration.

Various arrangement have been proposed for retracting a headrest of the seat in order to provide the seat with a more compact profile when folded. For example, U.S. Pat. No. 5,918,940 shows several embodiments of a seat having an adjusting mechanism for adjusting the height of a headrest according to the pivoting of a seatback relative to a seat cushion.

SUMMARY OF THE INVENTION

The present invention is a motor vehicle seat frame assembly having a headrest movable between an extended position and a retracted position. The frame assembly comprises a seatback frame operatively engaged with the headrest, a cable, and a rod having an extension. The seatback frame is pivotable from a use position to a lowered position, while the cable extends between the headrest and a fixed point. A tensioner is attached to the seatback frame, and is adapted to wind the cable on the extension when the seatback frame is pivoted toward the lowered position.

Accordingly, it is an object of the present invention to provide an assembly of the type described above which can be moved to a seating configuration and to a load floor configuration.

Another object of the present invention is to provide an assembly of the type described above that presents a retractable headrest.

Another object of the present invention is to provide an assembly of the type described above that facilitates the storage of relatively compact rear seats of the motor vehicle.

Still another object of the present invention is to provide an assembly of the type described above which is easy to use and cost-effective.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
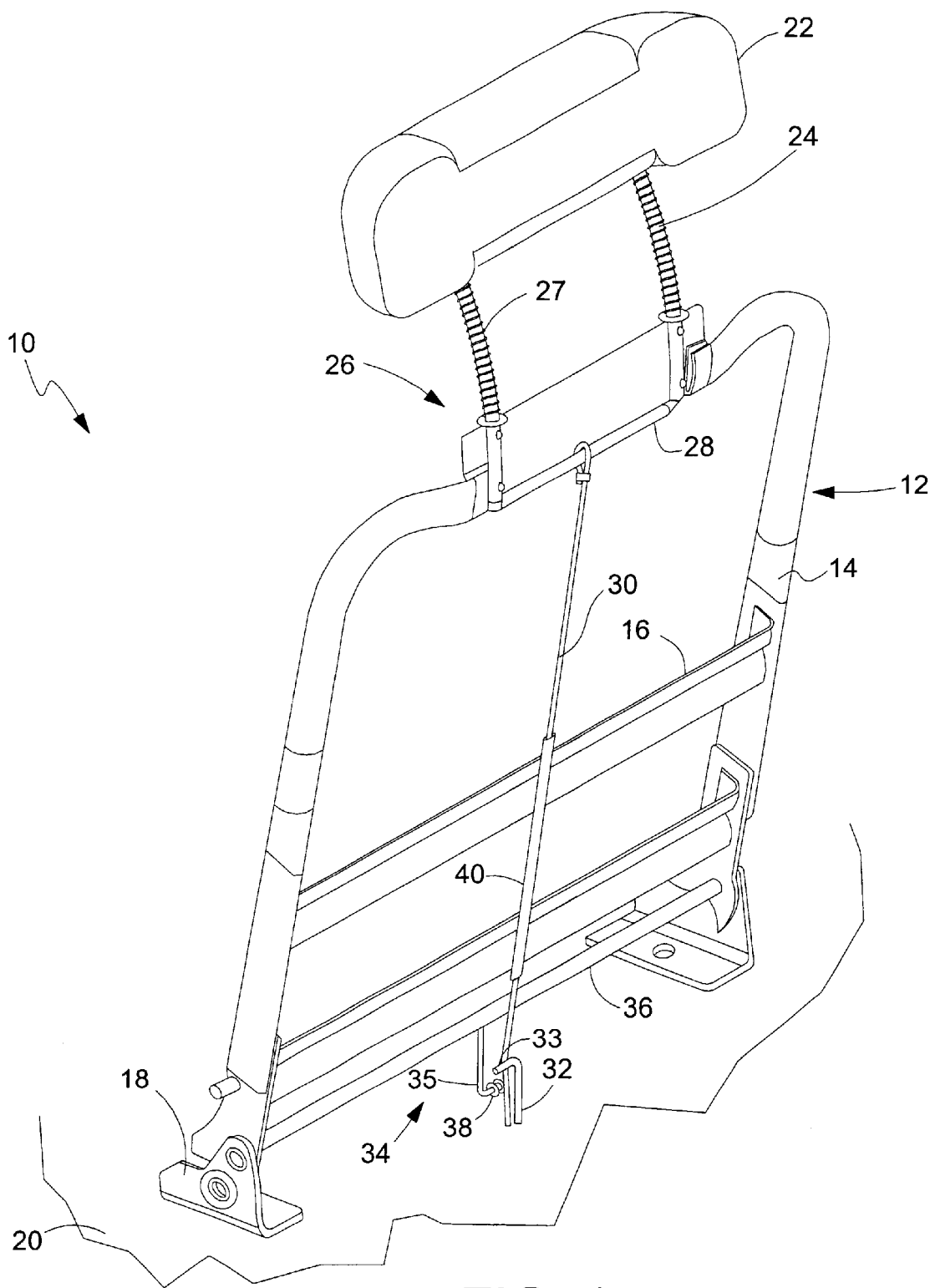
FIG. 1 is a perspective view of a frame assembly according to the present invention for a motor vehicle seat in an upright, use position with a headrest in an extended position.

FIG. 1 shows one embodiment 10 of a frame assembly according to the present invention for a motor vehicle seat. The seat frame assembly 10 includes a seatback frame 12 that may be formed of any conventional material and covered, although not shown, with a conventional foam cushion and seat cover. The seatback frame 12 preferably includes a pair of side members 14, and one or more braces 16 extending between the side members. The lower end of each side member 14 is mounted to a pivot 18, which in turn is secured to an interior load floor 20 of the motor vehicle in any known fashion. Alternatively, the pivot 18 may be attached to the frame of a generally horizontally disposed seat, cushion upon which an operator of the vehicle may sit, as is also well known.

Figure 2:
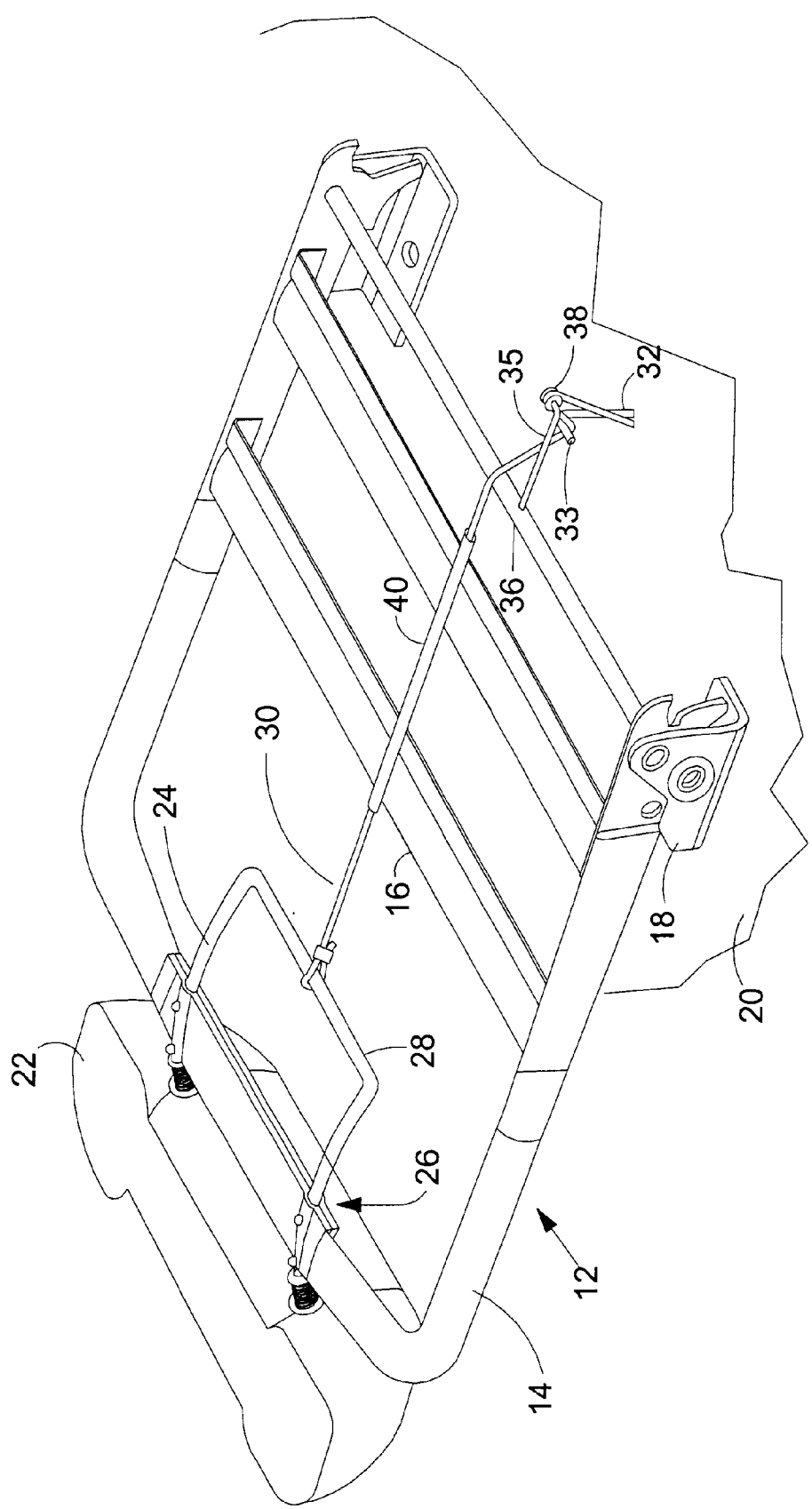
FIG. 2 is a perspective view of the frame assembly in a second, lowered position with the headrest in a retracted position.

The seatback frame 12 is pivotable about the pivot 18 between a relatively upright, operational position and a lowered, storage position shown in FIG. 2 generally parallel to the load floor 20. In the upright position, a headrest 22 is spaced above the top of the seatback frame 12 by one or more curved supports 24. The supports 24 engage a guide assembly 26, which is disposed between the side members 14 and forms the upper part of the seatback frame 12. The guide assembly 26 includes plates that include a pair of semi-cylindrical tracks having a radius of curvature matched to the radius of curvature of the supports 24. Means such as springs 27, acting between the top of the plates and the bottom of the headrest 22, may be provided to bias the headrest away from the top of the seat frame. The springs 27 also tend to bias the seatback frame 12 toward the upright position. Latching mechanisms, not shown, may also be provided to latch the seatback in either or both of the upright and stowed positions. Further details of this arrangement are taught in U.S, patent application Ser. No. 10/146,362 entitled Motor Vehicle Seat Having Curved Headrest Guide, the disclosure of which is hereby incorporated by reference.

The headrest 22 includes a lateral rod 28 that engages a headrest actuator cable 30. The cable 30 extends downwardly between the side members 14, between a rod 32 and a tensioner 34, and is connected at its lower end to the load floor 20. The rod 32 is L-shaped, including an extension 33 disposed generally parallel to the load floor 20. The tensioner 34 includes an L-shaped extension 35 welded or otherwise fixed to a seatback pivot axle 36, and a pulley 38 mounted on the end of the extension.

FIG. 2 shows that when the seatback frame 12 is rotated from its upright position to its lowered position, the pulley 38 engages the cable 30 and, as the L-shaped extension 35 moves past the extension 33 of the rod 32, loops the cable around the extension 33. The effective length of the cable 30 is thereby shortened, which pulls the rod 28, and thus the supports 24 and the headrest 22, against the force of the springs 27. The cable 30 may be provided with a sheath 40 to inhibit abrasion by the cross braces 16. As the supports 24 are drawn through the vertical portions of the guide assembly 26, the headrest 22 is drawn closer to the top of the seatback 12. The headrest 22 desirably rests against the top of the cushion overlying the seatback frame 12 when the seatback is pivoted forward to the greatest extent possible in the particular implementation.

The present invention thus provides a headrest that may be raised and lowered, without power, as the seatback is pivoted. With the headrest in the stowed position, the seatback occupies a relatively compact space without the need for undesirable cutouts or scallops in the seat cushion.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A seat frame assembly mounted in a motor vehicle and having a headrest movable between an extended position and a retracted position, the frame assembly comprising:
   a seatback frame operatively engaged with the headrest, the seatback frame being pivotable from a use position to a lowered position;
   a cable having a first end attached to the headrest and a second end attached to a fixed point in the motor vehicle;
   a rod fixed relative to the cable and having a portion transverse to the cable; and
   a tensioner attached to the seatback frame and positioned on an opposite side of the cable from the portion, the tensioner being adapted to deflect the cable around the portion when the seatback frame is pivoted toward the lowered position.

2. The frame assembly of claim 1 further comprising a headrest guide assembly connected to the seatback frame.

3. The frame assembly of claim 1 further comprising a spring bearing against the headrest.

4. The frame assembly of claim 3 wherein the spring biases the headrest away from the seatback frame.

5. The frame assembly of claim 1 wherein the fixed point is a vehicle load floor.

6. The frame assembly of claim 1 wherein the seatback frame is pivotable about a pivot that is fixed with respect to the vehicle.

7. A seat frame assembly mounted in a motor vehicle and having a headrest movable between an extended position and a retracted position as the frame assembly pivots, the frame assembly comprising:
   a seatback frame operatively engaged with the headrest, the seatback frame being pivotable from a use position to a lowered position;
   a cable having a first end attached to the headrest and a second end attached to a fixed point in the motor vehicle;
   a rod fixed relative to the cable and having a portion transverse to the cable; and
   a tensioner attached to the seatback frame and positioned on an opposite side of the cable from the portion, the tensioner being adapted to deflect the cable around the portion when the seatback frame is pivoted toward the lowered position.

8. The frame assembly of claim 7 further comprising a headrest guide assembly connected to the seatback frame.

9. The frame assembly of claim 7 further comprising a spring bearing against the headrest.

10. The frame assembly of claim 9 wherein the spring biases the headrest away from the seatback frame.

11. The frame assembly of claim 7 wherein the fixed point is a vehicle load floor.

12. The frame assembly of claim 7 wherein the seatback frame is pivotable about a pivot that is fixed with respect to the vehicle.

* * * * *